May 26, 1953
J. J. BARRY ET AL
2,639,492
MACHINE TOOL
Filed Oct. 3, 1947
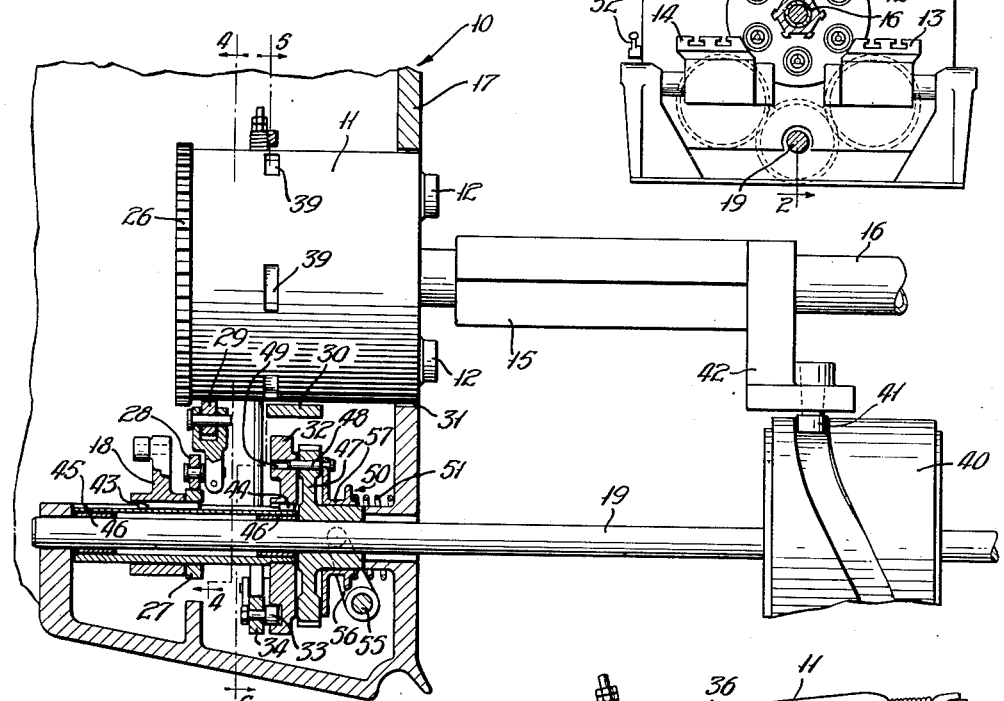
INVENTORS.
JOHN J. BARRY
WILLIAM B. RETZ
BY Mitchell Bechert
ATTORNEYS.

Patented May 26, 1953

2,639,492

UNITED STATES PATENT OFFICE 2,639,492

MACHINE TOOL

John J. Barry, Evanston, Ill., and William B. Retz, Plainville, Conn., assignors to The New Britain Machine Company, New Britain, Conn., a corporation of Connecticut Application October 3, 1947, Serial No. 777,798

4 Claims. (Cl. 29—37)

Our invention relates to an improved mechanism for an automatically indexing machine and in particular to a multiple-spindle lathe.

It is an object of our invention to provide an improved mechanism for assisting in the adjustment of tools for a machine of the character indicated.

It is another object to provide a relatively simple mechanism for disabling certain parts of such a machine (including the indexing mechanism thereof) while permitting others to continue to function, for the particular purpose of assisting in setting up the machine.

It is a further object to provide a means for continuously running a multiple-station indexing machine of the character indicated at a given station, with a given tool repeating its function on the work held at a particular station.

Other objects and various further features of the invention will be pointed out or will occur to those skilled in the art from a reading of the following specificatioan in conjunction with the accompanying drawings. In said drawings:

Fig. 1 is a simplified partially sectionalized end view of a multiple-spindle automatic machine incorporating features of the invention;

Fig. 2 is an enlarged sectional view taken substantially in the plane 2—2 of Fig. 1 and schematically illustrating cooperating elements of the invention;

Fig. 3 is a fragmentary detail schematically illustrating a further element of the arrangement of Figs. 1 and 2;

Fig. 4 is a sectional view taken substantially in the plane 4—4 of Fig. 2; and

Fig. 5 is a sectional view taken substantially in the plane 5—5 of Fig. 2.

Briefly stated, my invention contemplates simple, and preferably manually operated, means for disabling certain mechanisms of the multiple-station automatic machine for purposes of assisting in the setting up of such machine, as in the adjustment of tools. The invention is described in connection with an automatic multiple-spindle indexing machine in which the disabling means is employed to disengage the indexing mechanism for the spindle carried and also to disengage certain other mechanisms. While these mechanisms are disengaged, automatic control of tool slide feed is retained so that an operator may make proper adjustment of tools while testing (and, if necessary, repeatedly testing) their effectiveness on the same pieces of work.

Referring to the drawings, my invention is shown in application to a multiple spindle machine 10 including a spindle carrier 11 independently revolubly supporting a plurality of spindles 12 at equally spaced stations. The machine 10 may include a number of forming slides 13—14 for supporting forming tools to cooperate concurrently with separate pieces of work held in the spindles 12. End-working operations may be performed simultaneously on a plurality of the spindles 12 by means of suitable tools supported in a longitudinally guided tool slide 15, which may be of the so-called Gridley type. The tool slide 15 is shown supported on a tubular stem 16 which may span the distance between the front end (not shown) and the back end 17 of the machine.

Normally, during automatic operation of the machine 10 and after the various tools held in tool slides 13—14—15 have completed their working strokes, these tool slides are retracted and the spindle carrier 11 indexed. In the form shown, the indexing mechanism includes a Geneva arm 18 driven by the main camshaft 19. Arm 18 may successively engage the various slots 20 of a star or Geneva wheel 21 to drive a pinion 22 with an intermittent motion, characterized by relatively long dwell periods during which the various tool slides are actuated. The pinion 22, in the form shown, meshes with a similar pinion 23 on an idler shaft 24, and a further gear 25 on the same shaft 24 meshes with a large annular gear 26 at the rear end of the spindle carrier 11. It will be appreciated that with each cycle of engagement of the arm 18 with a slot 20 in the Geneva wheel 21 there will be sufficient incremental rotation imparted to the spindle carrier 11 to cause work held in spindles 12 to index to a succeeding station, for further working by the tools in tool slides 13—14—15.

The machine 10 may further incluude a spindle-carrier lifting mechanism for relieving possible binding forces during indexing. Such mechanisms are described in detail in D. H. Montgomery et al. Patent No. 2,118,015, May 17, 1938, and in the present case the lifting mechanism is schematically illustrated as comprising a cam 27 driven by the main camshaft 19. The lifting cam 27 may drive a cam-follower roll 28 to position a shoe 29 which, during cutting operations, may be out of engagement with the spindle carrier 11. During indexing however, the cam-follower roll 28 preferably rides up on cam 27 to lift the shoe 29 into engagement with the spindle carrier 11 and also slightly to raise the spindle carrier 11. As discussed fully in the above-mentioned patent, such lifting of the spindle carrier during indexing may relieve the wear on the spindle-carrier bearings, as at 30—31.

In addition to indexing and lifting mechanisms for the spindle carrier 11, the machine 10 may further include positioning and locking means, for properly locating and holding the spindle carrier with the spindles 12 in proper position with relation to the tools held in the tool slides. Spindle-carrier locking mechanisms have been fully described in the above-identified Montgomery et al. patent, and in the present application there is only a schematic showing of such a mechanism. In the form shown, the locating and locking mechanism includes a face cam 32 which may also be driven by the main camshaft 19. A cam-follower roll 33 rides in the groove of cam 32 to actuate an arm 34 pivotally supported by the frame of the machine. The motion of the arm 34 may be transmitted by a rod 35 to a bell crank or toggle link 36 which may also be pivotally supported by the frame. One arm or portion of the link 36 may serve to position a locating finger 37 and the other actuating portion thereof may control the placement of a camming and locking finger or lever 38. The fingers 37—38 are preferably located on opposite sides of the spindle carrier 11 and positioned so as to engage opposed walls of slots or grooves 39 which may be formed in the spindle carrier 11.

Preferably, the locating and locking cam 32 is timed to operate the fingers 37—38 for engagement with the spindle carrier at least for periods of cutting operation. After cutting and before indexing, the rod 35 may be pushed up by the cam 32 so as to impart clockwise movement to the toggle link 36 and thus to relieve both fingers 37—38 from their engagement with slots 39. After indexing, fingers 37—38 will have engaged another pair of slots 39, and cam 32 will have displaced the rod 35 so as to impart counterclockwise movement to the toggle 36, thus effecting the locating and locking function, as described more fully in the aforementioned patent.

For purposes of illustration, the tool slide 15 has been shown to be fed by a cam 40 which may also be driven by the main camshaft 19. A cam-follower roll 41 rides in the groove of cam 40 and, by means of a bridge or connecting arm 42, imparts feeding and retracting motion to the tool slide 15.

In accordance with the invention, simple means are provided for preferably manually disengaging in a single operation a number of the automatic mechanisms which have been described, while at the same time permitting otherwise fully automatic operation of the tool-slide feeding means and other parts of the machine. In the form shown, such simple disabling is effected by clutch means between the feed cam 40 and the indexing, lifting, and locking means 18—28—32. The index arm 18, the lifting cam 27, and the locating and locking cam 32 may all be keyed, as at 43—44, to a tubular member 45 which may be concentric with the main camshaft 19. The tubular member 45 may be freely rotatably supported, as by bushings 46 between shaft 19 and tubular member 45. A radially flanged clutch member 47 may be carried by and locked to the camshaft 19 and serve to support a locking pin 48 for engagement with a suitable aperture 49 in, say, the locating and locking cam 32. The pin 48 may be actuated for engagement with the cam 32 or out of engagement therewith by anchoring it to a sleeve member 50, which may be slidable over an extended boss or hub on the flange member 47. If desired, compressionally resilient means, such as a spring 51, may be wound around the shaft 19 to engage the sleeve member 50, so that the spring 51 may serve normally to position the pin 48 for clutching engagement of the camshaft 19 to the indexing and other automatic mechanisms.

In order to disengage the clutch pin 48 from cam 32 a hand crank 52 may be actuated to the right, i. e. clockwise in the sense of Fig. 3 of the drawings. The hand crank 52 may be formed with a cam surface 53 so as to provide relatively great mechanical advantage in the cranking of a clutch-shifting lever or crank 54 for rotating an actuating rod 55. The rod 55 may carry a fork or other means 56 to engage an annular groove 57 in the sleeve 50 for sliding the latter and, at the same time, the pin 48 into declutching position.

In order that all operations governed by the tubular member or auxiliary camshaft 45 may be properly synchronized with operations fixedly governed by the main camshaft 19, I prefer that the clutch means (e. g. pin 48 in aperture 49) shall include elements to engage or lock both camshafts together for only one relative angular position of the camshafts per cycle of an operation (e. g. indexing) governed by the auxiliary camshaft 45. Thus, after having set-up the machine with the clutch means 48—49 disengaged, one may be sure that there will be complete synchronism as between the indexing cycle and the feed cycle of Gridley slide 15, upon reengaging the clutch means.

If the machine 10 happens to be used in connection with an automatic stock-feed mechanism, I prefer that the control means for such stock-feed mechanism be retained ineffective for periods in which the clutch pin 48 is in declutching position. For the case illustrated, the stock-feed mechanism 58 includes an electrical control, and a normally open limit switch 59 is placed in series with the control circuit therefor. It will be appreciated that when the clutch-actuating lever 52 is in the solid-line position of Fig. 3, the spring 51 will be effective to maintain the pin 48 in clutching engagement with the cam 49, so that there may be a direct and completely normal automatic drive from the camshaft 19 to the indexing, lifting, and locking mechanisms described. At the same time, the crank arm 54 will be in its left-most position, maintaining a circuit through switch 59 closed, so that the stock-feed mechanism 58 may continue its normal automatic function. When the hand clutch 52 is actuated into a declutching position (see the dashed outlines of Fig. 3), the arm 54 will ride upon cam surface 53, not only to disengage the pin 48 but also to permit switch 59 to open (and thus to disable) the control circuit for the stock-feed mechanism 58.

It will be appreciated that we have described a relatively simple means for disabling the indexing mechanism of a multiple-station indexing machine, so as to make possible a simplified procedure in calibrating the tools and otherwise adjusting the cut for the various stations. The indexing mechanism may be disabled while tool-feed mechanisms remain fully automatic. If the indexing operation is normally accompanied by a lifting and unlocking of the spindle carrier, or by other automatic functions (such as stock feeding), these too may be disabled in a single operation of our disabling means. Operation of the disabling mechanism may be very simply performed from the operator's side of the machine by the actuation of a single hand crank.

While we have described our invention in detail for the preferred form shown, it will be understood that modifications may be made within the scope of the invention as defined in the appended claims.

We claim:

1. In a multiple-spindle machine of the character indicated, a spindle carrier, a camshaft and means for driving the same, tool-slide means including feed means driven by said camshaft, a tubular member concentric with said camshaft and rotatable with respect thereto, indexing means for said spindle carrier including a member locked to said tubular member, raising means for said spindle carrier including a member locked to said tubular member, locking means for said spindle carrier including a member locked to said tubular member, and clutch means between said camshaft and one of the members locked to said tubular member.

2. A machine according to claim 1, and manually operable means for said clutch means.

3. A machine according to claim 1, and an electrically controlled stock-feed mechanism including an electric switch positioned to operate in response to an operation of said clutch means.

4. In a multiple-spindle machine of the character indicated, an indexible spindle carrier including a plurality of work-supporting rotatable spindles, a tool-slide movable for cooperation with work in successive of said spindles, a main camshaft and means for driving the same, means connecting said tool-slide for operation by said main camshaft, whereby said tool-slide may be continuously operated in a given program as long as said main camshaft is operated, an auxiliary camshaft, indexing means for said spindle carrier and including an index drive member carried by said auxiliary camshaft, a clutch connecting said auxiliary camshaft directly to said main camshaft and for 1:1 rotation therewith, said clutch including elements engageable to lock said main camshaft to said auxiliary camshaft for only one relative angular position of said camshafts per cycle of said indexing means, and manually operable means for controlling the engagement and the disengagement of said clutch, whereby said indexing means may temporarily be effectively disabled when said cool-slide is positioned for cooperation with a particular spindle in said spindle carrier in order to permit semi-automatic setting-up trial cuts on only one piece of work, prior to throwing the machine into fully automatic indexing operation.

JOHN J. BARRY.
WILLIAM B. RETZ.

References Cited in the file of this patent
UNITED STATES PATENTS

| Number | Name | Date |
|--------|------|------|
| 170,605 | Tucker | Nov. 30, 1875 |
| 331,524 | Metzger et al. | Dec. 1, 1885 |
| 712,506 | Curtis | Nov. 4, 1902 |
| 786,353 | Gabriel | Apr. 4, 1905 |
| 904,866 | Gridley | Nov. 24, 1908 |
| 1,177,827 | Spencer | Apr. 4, 1916 |
| 1,389,216 | Potter | Aug. 30, 1921 |
| 2,055,435 | Gridley | Sept. 22, 1936 |
| 2,118,015 | Montgomery | May 17, 1938 |